(12) United States Patent
Miyachi et al.

(10) Patent No.: US 10,436,096 B2
(45) Date of Patent: Oct. 8, 2019

(54) HEAT EXCHANGER AND METHOD FOR CONTROLLING HEAT EXCHANGER

(71) Applicant: MITSUBISHI HITACHI POWER SYSTEMS, LTD., Yokohama-shi, Kanagawa (JP)

(72) Inventors: Tsuyoshi Miyachi, Tokyo (JP); Seiji Kagawa, Tokyo (JP); Naoyuki Kamiyama, Tokyo (JP); Tetsu Ushiku, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 225 days.

(21) Appl. No.: 15/548,619

(22) PCT Filed: Nov. 4, 2015

(86) PCT No.: PCT/JP2015/081040
§ 371 (c)(1),
(2) Date: Aug. 3, 2017

(87) PCT Pub. No.: WO2016/125353
PCT Pub. Date: Aug. 11, 2016

(65) Prior Publication Data
US 2018/0010504 A1    Jan. 11, 2018

(30) Foreign Application Priority Data

Feb. 5, 2015 (JP) .................................. 2015-021429

(51) Int. Cl.
*F01N 5/00* (2006.01)
*F23J 15/00* (2006.01)
(Continued)

(52) U.S. Cl.
CPC .................. *F01N 5/00* (2013.01); *F01N 9/00* (2013.01); *F23J 15/00* (2013.01); *F23J 15/06* (2013.01);
(Continued)

(58) Field of Classification Search
CPC . F01N 5/00; F01N 9/00; F28F 2250/06; F23J 15/00; F23J 15/06; F23J 15/08
See application file for complete search history.

(56) References Cited

U.S. PATENT DOCUMENTS 6,484,501 B1 * 11/2002 Mieth ................... F01K 23/065
                                                           60/618
7,507,381 B2    3/2009 Muramoto et al.
(Continued)

FOREIGN PATENT DOCUMENTS

CN    104208995 A    12/2014
EP    2 682 728 A1    1/2014
(Continued)

OTHER PUBLICATIONS

Office Action dated Feb. 7, 2018, issued in counterpart Korean Application No. 10-2017-7021574, with English translation (14 pages).
(Continued)

*Primary Examiner* — Patrick D Maines
(74) *Attorney, Agent, or Firm* — Westerman, Hattori, Daniels & Adrian, LLP

(57) ABSTRACT

A heat exchanger includes a heat recovery unit that causes a heat medium to recover heat from flue gas through first heat exchange by bringing the flue gas into contact with a fin tube; a reheater including a preheating unit configured to preheat flue gas through second heat exchange by bringing the flue gas into contact with a tube, and heating units that heat the flue gas through third heat exchange by bringing the (Continued)

flue gas into contact with the heat medium; and a control unit that calculates a recovered heat quantity to be recovered by the heat recovery unit from the flue gas through the first heat exchange, and that controls temperature of the heat medium after the first heat exchange within a predetermined range.

8 Claims, 6 Drawing Sheets

(51) Int. Cl.
  *F23J 15/06* (2006.01)
  *F23J 15/08* (2006.01)
  *F23L 15/00* (2006.01)
  *F01N 9/00* (2006.01)

(52) U.S. Cl.
  CPC .............. *F23J 15/08* (2013.01); *F23L 15/00* (2013.01); *F23J 2900/15081* (2013.01); *F28F 2250/06* (2013.01); *Y02E 20/348* (2013.01); *Y02E 20/363* (2013.01); *Y02T 10/16* (2013.01); *Y02T 10/47* (2013.01)

(56) References Cited

U.S. PATENT DOCUMENTS

| | | | |
|---|---|---|---|
| 7,833,501 | B2 | 11/2010 | Kobayashi et al. |
| 9,714,882 | B2 | 7/2017 | Kamiyama et al. |
| 2003/0145583 | A1* | 8/2003 | Tanaka .................... F01K 23/10 60/298 |
| 2003/0155108 | A1* | 8/2003 | Shinohara ................ B60K 6/48 165/146 |
| 2003/0188728 | A1* | 10/2003 | Shinohara ............. F01N 3/0205 123/568.17 |
| 2006/0099902 | A1 | 5/2006 | Kikkawa et al. |
| 2010/0071348 | A1 | 3/2010 | Kobayashi et al. |

FOREIGN PATENT DOCUMENTS

| | | | |
|---|---|---|---|
| GB | 2 299 768 | A | 10/1996 |
| JP | 9-122438 | A | 5/1997 |
| JP | 2000-161647 | A | 6/2000 |
| JP | 2001-074229 | A | 3/2001 |
| JP | 2002177732 | A | 6/2002 |
| JP | 2002-370012 | A | 12/2002 |
| JP | 2004-154683 | A | 6/2004 |
| JP | 2004-333033 | A | 11/2004 |
| JP | 3852820 | B2 | 12/2006 |
| JP | 2011-94901 | A | 5/2011 |
| JP | 2011094901 | A * | 5/2011 |
| JP | 2011-200781 | A | 10/2011 |
| JP | 2012-181069 | A | 9/2012 |
| JP | 2013-119982 | A | 6/2013 |
| WO | 2008/078721 | A1 | 7/2008 |
| WO | 2011/142376 | A1 | 11/2011 |

OTHER PUBLICATIONS

Office Action dated Feb. 22, 2019, issued in counterpart CN application No. 201580075318.9, with English translation. (10 pages).
Search Report dated Jan. 18, 2018, issued in counterpart European Application No. 15881170.3 (7 pages).
Search Report dated Jan. 26, 2016, issued in counterpart International Application No. PCT/JP2015/081040, with English translation (6 pages).
Written Opinion dated Jan. 26, 2016, issued in counterpart Application No. PCT/JP2015/081040, with English translation (15 pages).
Office Action dated May 14, 2019, issued in counterpart JP application No. 2015-021429, with English translation.(8 pages).

* cited by examiner

HEAT EXCHANGER AND METHOD FOR CONTROLLING HEAT EXCHANGER

FIELD

The present invention relates to a heat exchanger and a method for controlling the heat exchanger, for example, a heat exchanger that includes a preheating unit for preheating flue gas introduced into a reheater and a method for controlling the heat exchanger.

BACKGROUND

An air pollution control device is used in thermal power plants and chemical plants. In the air pollution control device, a denitration device, an air preheating unit air heater, a heat recovery unit of a reheating heat exchanger (gas-gas heater), a dry electronic precipitator, a wet desulfurization device, a reheater of the reheating heat exchanger, and a stack are sequentially provided from the upstream side toward the downstream side of a flue gas flow path. A gas-gas heater including a preheating unit that is provided on a flue gas introduction portion of a reheater and that preheats flue gas introduced into the reheater body has been developed as the heat exchanger used in the air pollution control device such as the above (for example, see Patent Literature 1). In the gas-gas heater disclosed in Patent Literature 1, wet flue gas that has passed through the wet desulfurization device is preheated and dried in the preheating unit supplied with a heat medium having been heated by the heat recovery unit and the heating unit. Because the flue gas is dried, it is possible to reduce dust in the flue gas from adhering to the inside of the reheater body and reduce corrosion inside of the reheater body resulting from wet components in the flue gas.

CITATION LIST

Patent Literature

Patent Literature 1: Japanese Laid-open Patent Publication No. 2011-094901

SUMMARY

Technical Problem

In the gas-gas heater disclosed in Patent Literature 1, the heat exchanger is controlled so that the temperature of the flue gas at the flue gas outlet portion of the heat recovery unit and the temperature of the heat medium at the heat medium outlet portion of the reheater will fall within respective predetermined ranges.

However, in the thermal power plants and the like, the gas temperature and the gas flow of the flue gas introduced into the air pollution control device may be reduced by the variation in the power generation load corresponding to the change in the operating conditions. Moreover, the temperature of the heat medium at the heat medium inlet portion of the reheater may be reduced by the change in the heat quantity of the flue gas recovered by the heat recovery unit. When the temperature of the heat medium at the heat medium inlet portion (preheating unit) of the reheater is reduced in this manner, the flue gas in the preheating unit of the reheater will not be sufficiently preheated. Thus, dust accompanying the wet flue gas from the desulfurization device easily adheres to a heat transfer tube in the reheater by using the mist in the flue gas as a binder. Consequently, the gas differential pressure between the inlet portion and the outlet portion of the reheater may be increased and corrosion inside the reheater may be accelerated.

The present invention has been made in view of the above circumstances, and an object of the present invention is to provide a heat exchanger and a method for controlling the heat exchanger capable of reducing dust in the flue gas from adhering to the inside of the reheater and reducing corrosion of the heat transfer tube, even if the operating conditions have changed.

Solution to Problem

A heat exchanger, comprising: a heat recovery unit that causes a heat medium to recover heat from flue gas from a combustion engine through first heat exchange by bringing the flue gas into contact with a heat transfer tube in which the heat medium flows; a reheater that includes a preheating unit configured to preheat the flue gas after the first heat exchange through second heat exchange by bringing the flue gas after the first heat exchange into contact with the heat transfer tube in which the heat medium after the first heat exchange flows, and a heating unit configured to heat the flue gas after the second heat exchange through third heat exchange by bringing the flue gas after the second heat exchange into contact with the heat medium after the second heat exchange; a circulation line that circulates the heat medium between the heat recovery unit and the reheater; and a control unit that calculates a recovered heat quantity to be recovered by the heat recovery unit from the flue gas through the first heat exchange, and that controls temperature of the heat medium after the first heat exchange within a predetermined range based on the calculated recovered heat quantity.

With this configuration, the temperature of the heat medium to be supplied to the preheating unit of the reheater is controlled on the basis of the recovered heat quantity that is recovered by the heat recovery unit from the flue gas introduced into the heat recovery unit. Consequently, it is possible to set the temperature of the heat medium to be supplied to the preheating unit within a predetermined range without delay, according to the change in the recovered heat quantity that is recovered by the heat recovery unit from the flue gas. In this manner, even if the operating conditions of a boiler and the like have changed, it is possible to implement the heat exchanger and the method for controlling the heat exchanger capable of reducing dust in the flue gas from adhering to the inside of the reheater, and reduce corrosion of the heat transfer tube of the preheating unit.

In the heat exchanger according to present invention, it is preferable that the control unit calculates the recovered heat quantity based on at least one type selected from the group consisting of gas temperature of the flue gas introduced into the heat exchanger, a gas flow of the flue gas, and operation load of the combustion engine. With this configuration, the accuracy of the recovered heat quantity calculated by the control unit will be improved. Consequently, it is possible to further reduce dust in the flue gas from adhering to the inside of the reheater and reduce corrosion of the heat transfer tube of the preheating unit.

In the heat exchanger according to present invention, it is preferable that the control unit heats the heat medium after the first heat exchange, when the recovered heat quantity is less than a predetermined value. With this configuration, the heat medium can be heated according to the recovered heat quantity. Consequently, it is possible to reduce dust in the flue gas from adhering to the inside of the reheater and reduce corrosion of the heat transfer tube of the preheating unit.

In the heat exchanger according to present invention, it is preferable that the control unit supplies steam to the heat medium after the first heat exchange from a steam supply unit, and sets the temperature of the heat medium after the first heat exchange within the predetermined range. With this configuration, the heat medium can be heated by steam. Consequently, it is possible to easily heat the heat medium.

In the heat exchanger according to present invention, it is preferable that the circulation line includes a bypass line that bypasses the heat recovery unit, and the control unit sets the temperature of the heat medium within the predetermined range, by circulating the heat medium between the heat recovery unit and the reheater via the bypass line, when the recovered heat quantity exceeds the predetermined value. With this configuration, even if the heat quantity recovered by the heat recovery unit is too large, it is possible to reduce the heat quantity recovered by the heat recovery unit, and set the temperature of the heat medium within a predetermined range.

In the heat exchanger according to present invention, it is preferable that in the reheater, a plurality of heat transfer tubes of the heating unit are arranged in a tetragonal lattice pattern relative to a flowing direction of the flue gas. With this configuration, the gas flow velocity of the flue gas of the heating unit will be improved. Consequently, it is possible to further reduce dust in the flue gas from adhering to the heating unit and reduce corrosion of a pipe.

A method for controlling a heat exchanger that includes a heat recovery unit that causes a heat medium to recover heat from flue gas from a combustion engine through first heat exchange by bringing the flue gas into contact with a heat transfer tube in which the heat medium flows; and a reheater that includes a preheating unit configured to preheat the flue gas after the first heat exchange using heat of the heat medium after the first heat exchange through second heat exchange by bringing the flue gas after the first heat exchange into contact with the heat transfer tube in which the heat medium after the first heat exchange flows, and a heating unit configured to heat the flue gas after the second heat exchange through third heat exchange by bringing the flue gas after the second heat exchange into contact with the heat medium after the second heat exchange, the method for controlling the heat exchanger, comprising: a step of calculating a recovered heat quantity to be recovered by the heat recovery unit from the flue gas through the first heat exchange; and a step of controlling temperature of the heat medium within a predetermined range by heating the heat medium after the first heat exchange, when the calculated recovered heat quantity becomes less than a predetermined value.

With this method, the temperature of the heat medium to be supplied to the preheating unit of the reheater is controlled on the basis of the recovered heat quantity that is recovered by the heat recovery unit from the flue gas introduced into the heat recovery unit. Consequently, it is possible to set the temperature of the heat medium to be supplied to the preheating unit within a predetermined range without delay, according to the change in the recovered heat quantity that is recovered by the heat recovery unit from the flue gas. In this manner, even if the operating conditions of the boiler and the like have changed, it is possible to implement the heat exchanger and the method for controlling the heat exchanger capable of reducing dust in the flue gas from adhering to the inside of the reheater, and reduce corrosion of the heat transfer tube of the preheating unit. With this configuration, even if the heat quantity recovered by the heat recovery unit is too large, it is possible to reduce the heat quantity recovered by the heat recovery unit, and set the temperature of the heat medium within a predetermined range.

In the method for controlling a heat exchanger according to present invention, it is preferable that the method further comprising a step of controlling the temperature of the heat medium within the predetermined range by making the heat medium flow in a bypass line that bypasses the heat recovery unit, when the calculated recovered heat quantity exceeds the predetermined value.

Advantageous Effects of Invention

With the present invention, even if the operating conditions have changed, it is possible to implement the heat exchanger and the method for controlling the heat exchanger capable of reducing dust in the flue gas from adhering to the inside of the reheater and reduce corrosion of the heat transfer tube.

DESCRIPTION OF EMBODIMENTS

Figure 1:
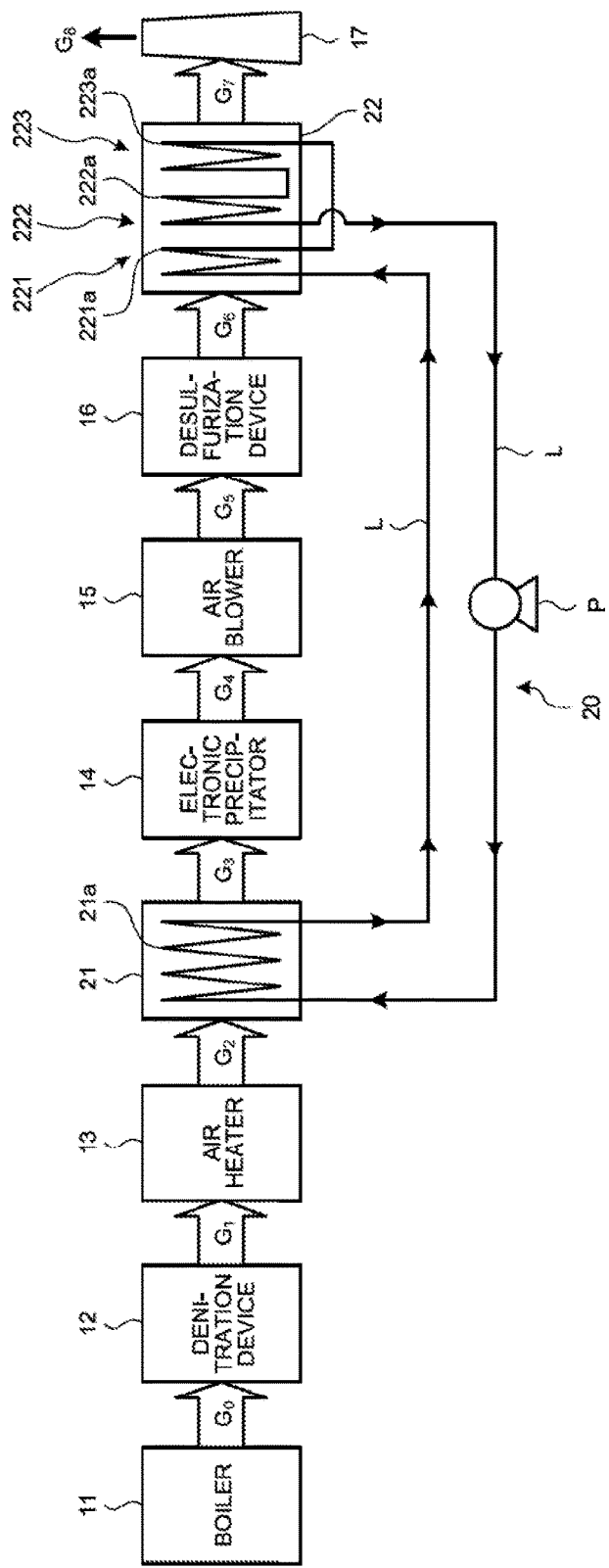
FIG. 1 is schematic diagram of an air pollution control system according to a first embodiment of the present invention.

Hereinafter, embodiments of the present invention will be described in detail with reference to the accompanying drawings. It is to be understood that the present invention is not limited to the following embodiments and may be implemented by suitably modifying the embodiments. Moreover, the present invention may be implemented by suitably combining the following embodiments. Furthermore, the same reference numerals denote the same components in the embodiments, and the repeated description will be omitted.

First Embodiment

FIG. 1 is a schematic diagram of an air pollution control system 10 according to a first embodiment of the present invention. As illustrated in FIG. 1, the air pollution control system 10 according to the present embodiment is an air pollution control system that treats flue gas discharged from a thermal power plant, a chemical plant, or the like, and that removes nitrogen oxides (NOx), dust, and sulfur oxides (SOx) included in the flue gas to discharge.

The air pollution control system 10 according to the present embodiment includes a boiler 11 installed in a thermal power plant, a chemical plant, and the like, a denitration device 12 provided at a subsequent stage of the boiler 11, an air heater (AH) 13 provided at a subsequent stage of the denitration device 12, and an electronic precipitator 14 provided at a subsequent stage of the air heater 13. The air pollution control system 10 also includes an air blower 15 provided at a subsequent stage of the electronic precipitator 14, a desulfurization device 16 provided at a subsequent stage of the air blower 15, and a stack 17 provided at a subsequent stage of the desulfurization device 16.

A heat recovery unit 21 of a heat exchanger 20 according to the present embodiment is disposed between the air heater 13 and the electronic precipitator 14. A reheater 22 of the heat exchanger (gas-gas heater) 20 according to the present embodiment is disposed between the desulfurization device 16 and the stack 17. A fin tube 21a as a heat transfer tube in which a heat medium flows is provided inside the heat recovery unit 21. The reheater 22 includes a preheating unit 221 that preheats the flue gas introduced into the reheater 22, a low-temperature heating unit 222 that heats the flue gas preheated by the preheating unit 221, and a high-temperature heating unit 223 that further heats the flue gas heated by the low-temperature heating unit 222. A tube 221a is disposed inside the preheating unit 221 as a heat transfer bare tube. A fin tube 222a is disposed inside the low-temperature heating unit 222 as a heat transfer tube. A fin tube 223a is disposed inside the high-temperature heating unit 223 as a heat transfer tube. A circulation line L that circulates a heat medium M between the heat recovery unit 21 and the reheater 22 is provided between the heat recovery unit 21 and the reheater 22. A liquid feeding pump P that circulates the heat medium M in the circulation line L between the heat recovery unit 21 and the reheater 22 is provided on the circulation line L. Heat exchange is performed between the heat recovery unit 21 and the reheater 22, using the heat medium M that flows in the circulation line L by the liquid feeding pipe P.

Flue gas $G_0$ discharged from the boiler 11 is introduced into the denitration device 12 filled with a catalyst. The flue gas $G_0$ introduced into the denitration device 12 is made harmless by reducing the nitrogen oxides included in the flue gas $G_0$ to water and nitrogen, with ammonia ($NH_3$) injected into the denitration device 12 as a reducing agent.

Flue gas $G_1$ discharged from the denitration device 12 is introduced into the air heater (AH) 13. For example, the temperature of the flue gas $G_1$ introduced into the air heater 13 is cooled to equal to or more than 130 degrees Celsius and equal to or less than 150 degrees Celsius, by heat exchange with air.

Flue gas $G_2$ discharged from the air heater 13 is introduced into the heat recovery unit 21 of the heat exchanger (gas-gas heater) 20 according to the present embodiment. The heat of the flue gas $G_2$ introduced into the heat recovery unit 21 is recovered and cooled by heat exchange with a heat medium (such as water), when the flue gas $G_2$ is brought into contact with the fin tube 21a in which the heat medium M flows. For example, the temperature of flue gas $G_3$ after the heat exchange in the heat recovery unit 21 is equal to or more than 85 degrees Celsius and equal to or less than 110 degrees Celsius.

The flue gas $G_3$ discharged from the heat recovery unit 21 is introduced into the electronic precipitator (EP) 14 to remove dust. In this example, dust such as fly ash in the flue gas $G_3$ that is cooled by heat exchange in the heat recovery unit 21 is removed. Consequently, it is possible to improve the dust collection efficiency of the electronic precipitator 14.

The air blower 15 driven by a motor boosts the pressure of flue gas $G_4$ discharged from the electronic precipitator 14. It is to be understood that the air blower 15 is not necessarily provided. The air blower 15 may also be provided at a subsequent stage of the reheater 22 of the heat exchanger 20.

Flue gas $G_5$ the pressure of which is boosted by the air blower 15 is introduced into the desulfurization device 16. In the desulfurization device 16, sulfur oxides in the flue gas $G_5$ are absorbed and removed by absorbent in which slurry limestone is dissolved, and gypsum (not illustrated) is generated as a by-product. In this example, flue gas $G_6$ discharged from the desulfurization device 16 absorbs water in the absorbent and becomes wet. The temperature of the flue gas $G_6$ is reduced to, for example, about 50 degrees Celsius.

The flue gas $G_6$ discharged from the desulfurization device 16 is introduced into the heat recovery unit 21 of the heat exchanger (gas-gas heater) 20 according to the present embodiment. The flue gas $G_6$ introduced into the heat recovery unit 21 is sequentially brought into contact with the tube 221a, the fin tube 222a, and the fin tube 223a in the preheating unit 221, the low-temperature heating unit 222, and the high-temperature heating unit 223, and is heated by heat exchange with the heat medium. In this example, the preheating unit 221 heats the wet flue gas $G_6$ to the temperature exceeding 50 degrees Celsius in advance. Thus, the humidity of the wet flue gas $G_6$ is reduced. Consequently, it is possible to prevent dust accompanying the flue gas $G_6$ from adhering to the low-temperature heating unit 222, and corrosion of the low-temperature heating unit 222 caused by the mist of the absorbent in the flue gas $G_6$ and the like. The flue gas $G_6$ the heat of which is exchanged in the reheater 22 is discharged through the stack 17.

Figure 2:
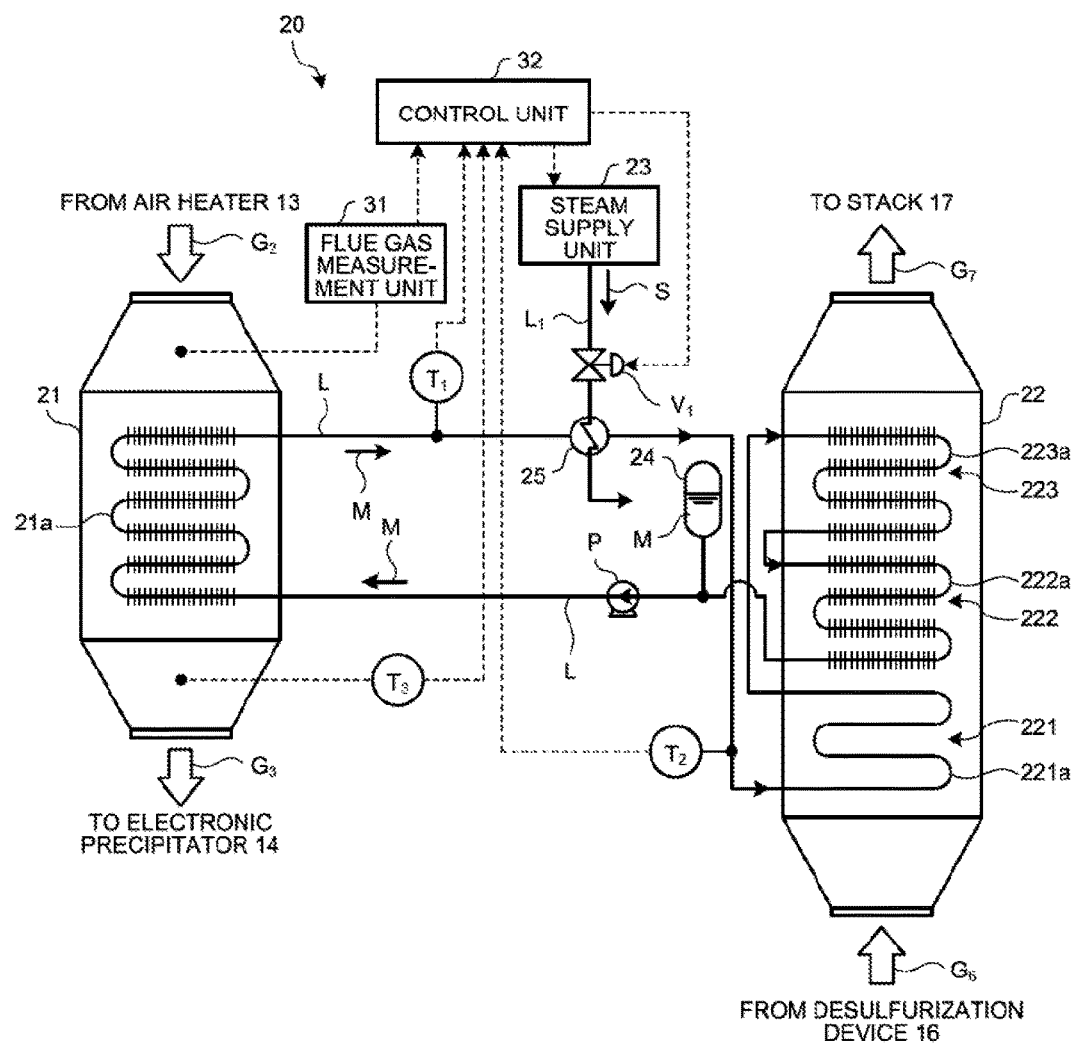
FIG. 2 is a schematic view of a heat exchanger according to the first embodiment of the present invention.

FIG. 2 is a schematic view of the heat exchanger 20 according to the present embodiment. As illustrated in FIG. 2, the heat exchanger 20 according to the present embodiment includes the heat recovery unit 21, the reheater 22, and a steam supply unit 23. The heat recovery unit 21 heats the heat medium M by causing the heat medium M to recover the heat from the flue gas $G_2$ that is introduced from the air heater 13, and discharges the cooled flue gas $G_3$ after the heat is recovered, to the electronic precipitator 14. The reheater 22 heats the wet flue gas $G_6$ introduced from the desulfurization device 16 with the heat medium M, and discharges the heated flue gas $G_7$ to the stack 17. The steam supply unit 23 supplies steam S to the heat medium M in the circulation line L that supplies the heat medium M from the heat recovery unit 21 toward the reheater 22. The heat medium M that is heated by the heat recovery unit 21 is transmitted to the reheater 22 by the liquid feeding pump P through the circulation line L. Moreover, the heat medium M that is cooled by the reheater 22 is transmitted to the heat recovery unit 21 by the liquid feeding pump P through the circulation line L. The heat medium M is supplied to the circulation line L that supplies the heat medium M from the reheater 22 toward the heat recovery unit 21, from a heat medium tank 24 as required.

The fin tube 21a is disposed inside the heat recovery unit 21. The fin tube 21a is a heat transfer tube obtained by providing a plurality of fins that are heat sinks on a tube-shaped member. The circulation line L for circulating the heat medium M between the heat recovery unit 21 and the reheater 22 is connected to the fin tube 21a. The heat exchanger 20 heats the heat medium M by causing the heat medium M to recover the heat from the flue gas $G_2$ by first heat exchange in which the flue gas $G_2$ introduced into the heat recovery unit 21 from the air heater 13 is brought into contact with the fin tube 21a. The heated heat medium M is transmitted toward the reheater 22 by the liquid feeding pump P provided on the circulation line L.

The reheater 22 includes the preheating unit 221, the low-temperature heating unit 222, and the high-temperature heating unit 223. The preheating unit 221 includes the tube 221a as the heat transfer bare tube that is a tube-shaped member. The low-temperature heating unit 222 includes the fin tube 222a as the heat transfer tube obtained by providing the fins that are heat sinks on a tube-shaped member. The high-temperature heating unit 223 includes the fin tube 223a as the heat transfer tube obtained by providing the fins that are heat sinks on a tube-shaped member. One end of the tube 221a is connected to the circulation line L, and the other end of the tube 221a is connected to an end of the fin tube 223a via the circulation line L. The other end of the fin tube 223a is connected to one end of the fin tube 222a via the circulation line L. The other end of the fin tube 222a is connected to the circulation line L. In other words, in the reheater 22, the heat medium M after the first heat exchange that is supplied from the heat recovery unit 21 is sequentially transmitted through the preheating unit 221, the high-temperature heating unit 223, and the low-temperature heating unit 222, in the order of the preheating unit 221, the high-temperature heating unit 223, and the low-temperature heating unit 222. The heat medium M supplied to the low-temperature heating unit 222 is transmitted to the heat recovery unit 21 through the circulation line L.

The preheating unit 221 heats the flue gas $G_6$ and reduces the humidity of the wet flue gas $G_6$, by second heat exchange in which the wet flue gas $G_6$ introduced to the reheater 22 from the desulfurization device 16 is brought into contact with the heated heat medium M after the first heat exchange that is supplied from the heat recovery unit 21. The preheating unit 221 also cools the heat medium M. The preheating unit 221 further supplies the flue gas $G_6$ after the second heat exchange and the humidity of which is reduced, to the low-temperature heating unit 222 and the high-temperature heating unit 223. The preheating unit 221 also supplies the cooled heat medium M after the second heat exchange to the high-temperature heating unit 223.

The low-temperature heating unit 222 further heats the flue gas $G_6$ by third heat exchange in which the flue gas $G_6$ supplied from the preheating unit 221 is brought into contact with the heat medium M supplied from the high-temperature heating unit 223. The low-temperature heating unit 222 also cools the heat medium M. In this example, the wet flue gas $G_6$ is heated by the preheating unit 221 and is turned into the flue gas $G_6$ the humidity of which is reduced. Consequently, it is possible to prevent dust accompanying the flue gas $G_6$ from adhering to the tube 221a of the preheating unit 221, and corrosion of the tube 221a of the preheating unit 221 caused by the mist. Moreover, the low-temperature heating unit 222 supplies the flue gas $G_6$ after the third heat exchange to the high-temperature heating unit 223, and supplies the cooled heat medium M after the third heat exchange to the heat recovery unit 21.

The high-temperature heating unit 223 further heats the flue gas $G_6$ that is heated by fourth heat exchange in which the heated flue gas $G_6$ that is supplied from the low-temperature heating unit 222 is brought into contact with the heat medium M after the second heat exchange that is supplied from the preheating unit 221. The high-temperature heating unit 223 also cools the heat medium M. The high-temperature heating unit 223 further supplies the flue gas $G_7$ after the third heat exchange to the stack 17, and supplies the cooled heat medium M after the third heat exchange to the heat recovery unit 21. In this example, the flue gas $G_6$ supplied from the preheating unit 221 is heated to sufficient temperature by the low-temperature heating unit 222 and the high-temperature heating unit 223. Thus, it is possible to prevent white smoke generated from flue gas $G_7$ that is discharged toward the stack 17.

The steam supply unit (heating unit) 23 supplies the steam S toward a heat exchanging unit 25 that is provided on the circulation line L for supplying the heat medium M toward the reheater 22 from the heat recovery unit 21 through a steam supply line $L_1$. A flow control valve $V_1$ for controlling the flow of steam supplied to the heat exchanging unit 25 from the steam supply unit 23 is provided on the steam supply line $L_1$. In this manner, when the steam supply unit 23 supplies the steam S to the heat medium M and heats the heat medium M that flows in the circulation line L, even if the heat quantity recovered by the heat recovery unit 21 from the flue gas $G_0$ that is supplied from the boiler 11 is not sufficient, the heat medium M supplied to the preheating unit 221 can be heated to a predetermined temperature range. Thus, the heat exchanger 20 can sufficiently heat the wet flue gas $G_6$ in the preheating unit 221 of the reheater 22. Consequently, it is possible to prevent dust in the flue gas $G_6$ from adhering to the tube 221a of the preheating unit 221, and corrosion of the tube 221a caused by the mist.

The heat exchanger 20 according to the present embodiment includes a flue gas measurement unit 31 and a control unit 32. The flue gas measurement unit 31 is provided on an introduction portion of the flue gas $G_2$ that is introduced to the heat recovery unit 21 from the air heater 13, in the heat recovery unit 21. The control unit 32 controls the temperature of the heat medium M that flows in the circulation line L on the basis of a measurement value measured by the flue gas measurement unit 31.

The flue gas measurement unit 31 measures the gas flow of the flue gas $G_2$ introduced into the heat recovery unit 21, the gas temperature of the flue gas $G_2$, and the like and transmits the measurement values to the control unit 32. The control unit 32 calculates the recovered heat quantity that is to be recovered to the heat medium M from the flue gas $G_2$ through the first heat exchange by the heat exchanger 20, from introduction conditions of the flue gas $G_2$ to the heat recovery unit 21. The introduction conditions are based on the various measurement values transmitted from the flue gas measurement unit 31; air volume supplied to an induced draft fan (IDF, not illustrated) that blows the flue gas $G_0$ after combustion from the boiler 11, a boost up fan (BUF, not illustrated) provided on the desulfurization device 16, as well as the boiler 11; combustion load of the boiler 11; and the like. The control unit 32 then controls the flow of the steam S supplied to the heat medium M by the steam supply unit 23 and the flow control valve $V_1$ so that the temperature at an outlet portion of the circulation line L from the heat recovery unit 21 that is measured by a temperature measurement device $T_1$ will fall within a predetermined range, on the basis of the calculated recovered heat quantity. In this manner, the heat exchanger 20 can speedily calculate the recovered heat quantity through the first heat exchange by the heat exchanger 20, on the basis of the introduction conditions of the flue gas $G_2$ to the heat recovery unit 21 that is calculated by the control unit 32. Because it is possible to set temperature $T_2$ at the outlet portion of the heat recovery unit 21 and temperature $T_3$ at the outlet portion of the reheater 22 within a predetermined range, even if the heat quantity recovered by the heat exchanger 20 is changed, it is possible to set the temperature of the heat medium M to be supplied to the preheating unit 221 of the reheater 22 within a predetermined range at an early stage. Consequently, it is possible to prevent dust from adhering to the tube 221a of the preheating unit 221, and corrosion of the tube 221a of the preheating unit 221 at an early stage.

Figure 3:
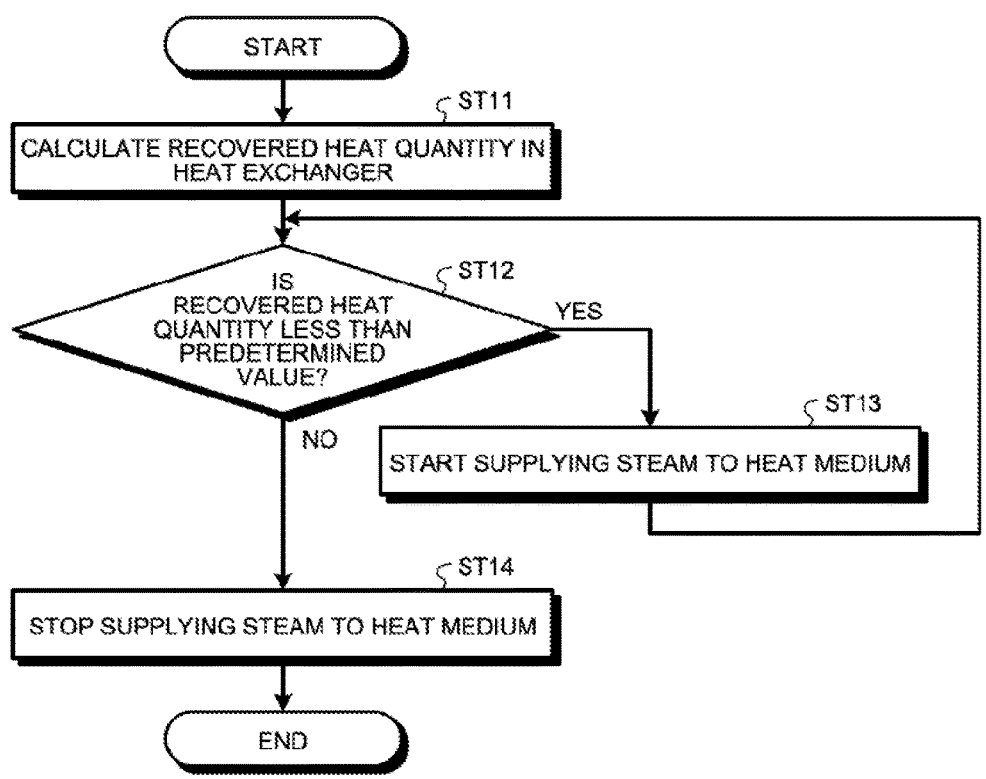
FIG. 3 is a flow chart of a method for controlling the heat exchanger according to the first embodiment of the present invention.

Next, a method for controlling the heat exchanger 20 according to the present embodiment will be described in detail with reference to FIG. 3. FIG. 3 is a flow chart of the method for controlling the heat exchanger 20 according to the present embodiment. As illustrated in FIG. 3, the method for controlling the heat exchanger 20 according to the present embodiment includes a first step of calculating the heat quantity recovered by the heat exchanger 20, a second step of determining whether the calculated recovered heat quantity is less than a predetermined value, a third step of starting supplying the steam S to the heat medium M when the calculated recovered heat quantity is less than the predetermined value, and a fourth step (step ST14) of stopping supplying the steam S to the heat medium M when the calculated recovered heat quantity exceeds the predetermined value.

First, when the operation of the heat exchanger 20 has started, the control unit 32 calculates the recovered heat quantity that is to be recovered to the heat medium M from the flue gas $G_2$ through the first heat exchange by the heat exchanger 20, from introduction conditions of the flue gas $G_2$ to the heat recovery unit 21 (step ST11). The introduction conditions are based on the various measurement values transmitted from the flue gas measurement unit 31; air volume supplied to the induced draft fan (IDF, not illustrated) that blows the flue gas $G_0$ after combustion from the boiler 11, the boost up fan (BUF, not illustrated) provided on the desulfurization device 16, as well as the boiler 11; combustion load of the boiler 11; and the like.

Next, the control unit 32 determines whether the calculated recovered heat quantity is less than a predetermined value, by comparing the calculated recovered heat quantity with a predetermined threshold set in advance (step ST12). When the calculated recovered heat quantity is less than the predetermined value (Yes at step ST12), the control unit 32 starts supplying the steam S from the steam supply unit 23, and supplies the steam S to the heat medium M in the circulation line L by opening the flow control valve $V_1$ of the steam supply line $L_1$ (step ST13). In this manner, it is possible to set the temperature of the heat medium M to be supplied to the preheating unit 221 of the reheater 22 within a predetermined range. Consequently, it is possible to prevent dust parts in the flue gas $G_6$ from adhering to the tube 221a of the preheating unit 221, and corrosion of the tube 221a of the preheating unit 221. Moreover, when the calculated recovered heat quantity exceeds the predetermined value (No at step ST12), the control unit 32 stops supplying the steam S from the steam supply unit 23 and stops supplying the steam S to the heat medium M in the circulation line L by closing the flow control valve $V_1$ of the steam supply line $L_1$ (step ST14).

As described above, with the above embodiment, the temperature of the heat medium M to be supplied to the preheating unit 221 of the reheater 22 is controlled on the basis of the recovered heat quantity that is recovered by the heat recovery unit 21 from the flue gas $G_2$ introduced into the heat recovery unit 21. Consequently, it is possible to set the temperature of the heat medium M to be supplied to the preheating unit 221 within a predetermined range without delay, according to the change in the recovered heat quantity that is recovered by the heat recovery unit 21 from the flue gas $G_2$. In this manner, even if the operating conditions of the boiler 11 and the like have changed, it is possible to implement the heat exchanger and the method for controlling the heat exchanger capable of reducing dust in the flue gas $G_6$ from adhering to the inside of the reheater 22, and reduce corrosion of the tube 221a of the preheating unit 221.

Second Embodiment

Next, a second embodiment of the present invention will be described. In the following, points different from those in the above-described first embodiment are mainly described, and the repeated description will be omitted.

Figure 4:
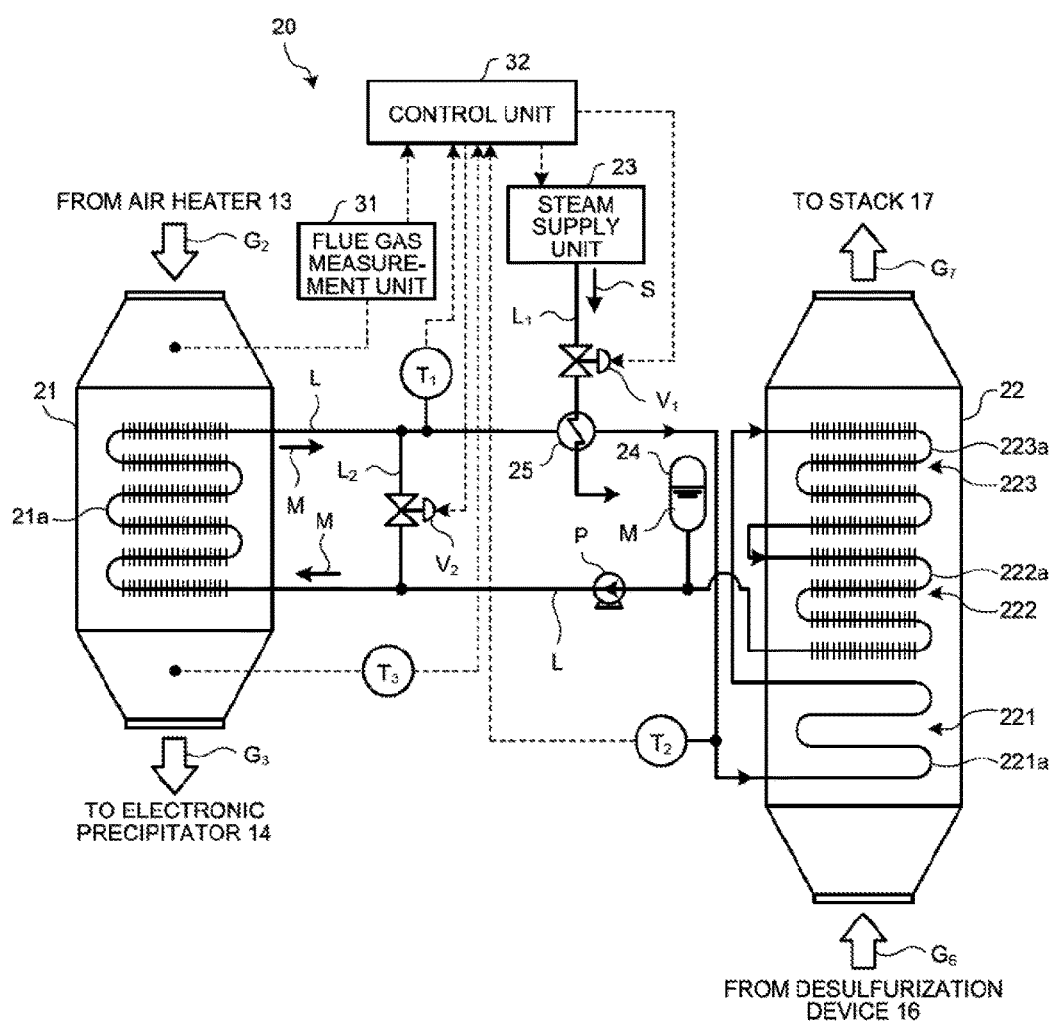
FIG. 4 is a schematic view of a heat exchanger according to a second embodiment of the present invention.

FIG. 4 is a schematic view of the heat exchanger 20 according to the second embodiment of the present invention. As illustrated in FIG. 4, the heat exchanger 20 according to the present embodiment includes a bypass line $L_2$ provided between the circulation line L for supplying the heat medium M to the heat recovery unit 21 from the reheater 22, and the circulation line L for supplying the heat medium M to the reheater 22 from the heat recovery unit 21. A flow control valve $V_2$ for adjusting the flow of the heat medium M that flows in the bypass line $L_2$ is provided on the bypass line $L_2$. The flow control valve $V_2$ is openable and closable by the control unit 32. In other words, in the heat exchanger 20 according to the present embodiment, the control unit 32 adjusts the opening degree of the flow control valve $V_2$ according to the heat quantity recovered by the heat recovery unit 21 that is calculated by the control unit 32. Thus, it is possible to control the flow of the heat medium M that flows in the bypass line $L_2$. Consequently, even if the gas flow and the gas temperature of the flue gas $G_2$ to be supplied from the air heater 13 is high, it is possible to prevent excessive heat recovery by the heat recovery unit 21 and control the recovered heat quantity to be recovered to the heat medium M within a predetermined range. The other configurations are the same as those in the heat exchanger 20 according to the first embodiment described above, and the description thereof will be omitted.

Figure 5:
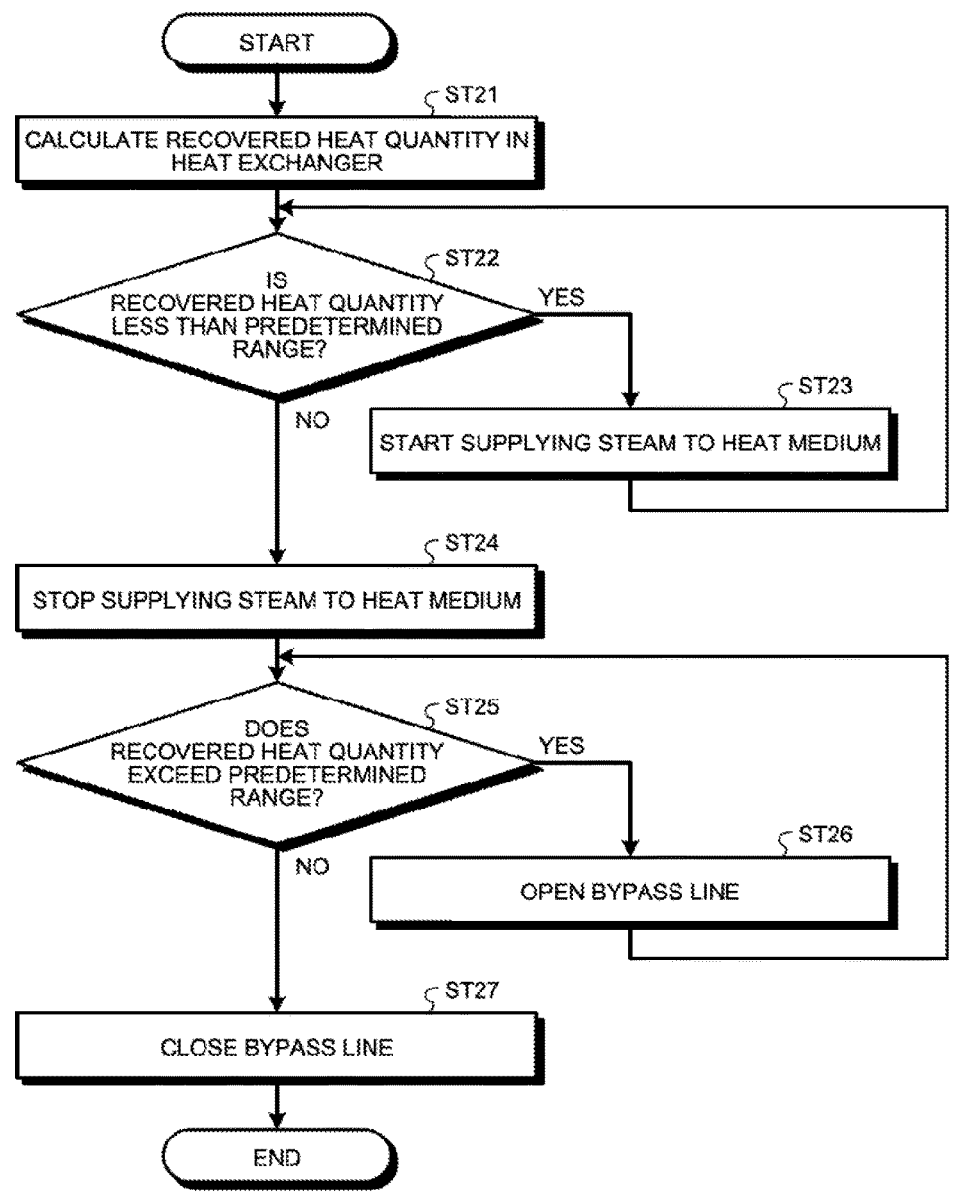
FIG. 5 is a flow chart of a method for controlling the heat exchanger according to the embodiment of the present invention.

Next, the method for controlling the heat exchanger 20 according to the present embodiment will be described in detail with reference to FIG. 5. FIG. 5 is a flow chart of the method for controlling the heat exchanger 20 according to the present embodiment. As illustrated in FIG. 5, the method for controlling the heat exchanger 20 according to the present embodiment includes a first step of calculating the heat quantity recovered by the heat exchanger 20, a second step of determining whether the calculated recovered heat quantity is less than a predetermined range, a third step of starting supplying the steam S to the heat medium M when the calculated recovered heat quantity is less than the predetermined range, a fourth step of stopping supplying the steam S to the heat medium M when the calculated recovered heat quantity falls within the predetermined range, a fifth step of determining whether the calculated recovered heat quantity exceeds the predetermined range, a sixth step of opening the bypass line $L_2$ when the calculated recovered heat quantity exceeds the predetermined range, and a seventh step of closing the bypass line $L_2$ when the calculated recovered heat quantity falls within the predetermined range.

First, when the operation of the heat exchanger 20 has started, the control unit 32 calculates the recovered heat quantity that is to be recovered to the heat medium M from the flue gas $G_2$ through the first heat exchange by the heat exchanger 20, from introduction conditions of the flue gas $G_2$ to the heat recovery unit 21 (step ST21). The introduction conditions are based on the various measurement values transmitted from the flue gas measurement unit 31; air volume supplied to the induced draft fan (IDF, not illustrated) that blows the flue gas $G_0$ after combustion from the boiler 11, the boost up fan (BUF, not illustrated) provided on the desulfurization device 16, as well as the boiler 11; combustion load of the boiler 11; and the like.

The control unit 32 then determines whether the calculated recovered heat quantity is less than the predetermined range by comparing the calculated recovered heat quantity with a predetermined threshold set in advance (step ST22). When the calculated recovered heat quantity is less than the predetermined range (Yes at step ST22), the control unit 32 starts supplying the steam S from the steam supply unit 23, and supplies the steam S to the heat medium M in the circulation line L by opening the flow control valve $V_1$ of the steam supply line $L_1$ (step ST23). In this manner, it is possible to set the temperature of the heat medium M supplied to the preheating unit 221 of the reheater 22 within a predetermined range. Consequently, it is possible prevent the dust parts in the flue gas $G_6$ from adhering to the tube 221a of the preheating unit 221, and corrosion of the tube 221a of the preheating unit 221. Moreover, when the calculated recovered heat quantity exceeds the predetermined range (No at step ST22), the control unit 32 stops supplying the steam S from the steam supply unit 23, and stops supplying the steam S to the heat medium M in the circulation line L by closing the flow control valve $V_1$ of the steam supply line $L_1$ (step ST24).

The control unit 32 then determines whether the calculated recovered heat quantity exceeds the predetermined range by comparing the calculated recovered heat quantity with a predetermined threshold set in advance (step ST25). When the calculated recovered heat quantity exceeds the predetermined range (Yes at step ST25), the control unit 32 opens the flow control valve $V_2$ of the bypass line $L_2$ and circulates a part of the heat medium M to the reheater 22 through the bypass line $L_2$ without via the heat recovery unit 21 (step ST26). In this manner, the heat exchanger 20 can prevent the excessive recovery of heat quantity from the flue gas $G_2$ to be introduced into the heat recovery unit 21. Consequently, it is possible to set the temperature of the heat medium M to be supplied to the preheating unit 221 of the reheater 22 within a predetermined range. It is also possible to prevent the dust parts in the flue gas $G_6$ from adhering to the tube 221a of the preheating unit 221, and corrosion of the tube 221a of the preheating unit 221. Moreover, when the calculated recovered heat quantity does not fall within the predetermined range (No at step ST25), the control unit 32 closes the flow control valve $V_2$ of the bypass line L2, and circulates the heat medium M between the reheater 22 and the heat recovery unit 21 without via the bypass line $L_2$ (step ST27).

As described above, according to the present embodiment, the temperature of the heat medium M to be supplied to the preheating unit 221 of the reheater 22 and the supply of the heat medium M to the heat recovery unit 21 are controlled, on the basis of whether the recovered heat quantity that is recovered by the heat recovery unit 21 from the flue gas $G_2$ introduced into the heat recovery unit 21 falls within a predetermined range. Consequently, even if the recovered heat quantity that is recovered by the heat recovery unit 21 from the flue gas $G_2$ is equal to or more than the predetermined value, it is possible to set the temperature of the heat medium M to be supplied to the preheating unit 221 within a predetermined range without delay, according to the change in the recovered heat quantity that is recovered by the heat recovery unit 21 from the flue gas $G_2$. In this manner, even if the operating conditions of the boiler 11 and the like have changed, it is possible to implement the heat exchanger and the method for controlling the heat exchanger capable of reducing dust in the flue gas $G_6$ from adhering to the inside of the reheater 22, and reduce corrosion of the tube 221a of the preheating unit 221.

The arrangement configuration of the tube 221a of the preheating unit 221, the fin tube 222a of the low-temperature heating unit 222, and the fin tube 223a of the high-temperature heating unit 223 in the reheater 22 of the first embodiment and the second embodiment described above is not particularly limited as long as it is possible to heat the flue gas $G_6$ to be introduced into the reheater 22 to a predetermined temperature.

Figure 6A:
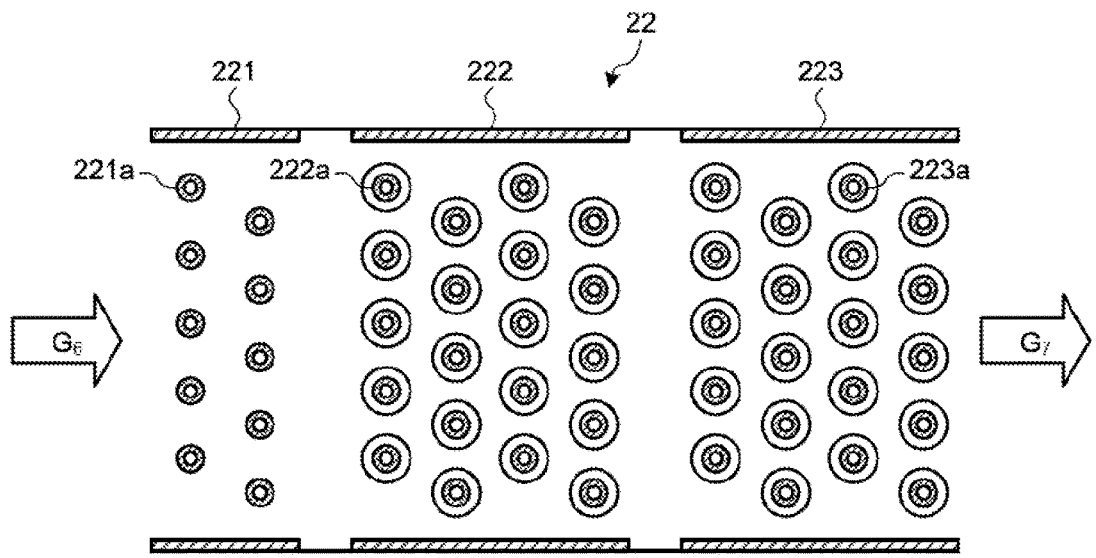
FIG. 6A is a diagram illustrating an example of a configuration of a reheater according to the embodiment of the present invention.

FIG. 6A is a diagram illustrating an example of a configuration of the reheater 22. FIG. 6A is a schematic view of a vertical section of a plurality of the tubes 221a, the fin tubes 222a, and the fin tubes 223a of the preheating unit 221, the low-temperature heating unit 222, and the high-temperature heating unit 223 of the reheater 22 relative to the extending direction of the tubes 221a, the fin tubes 222a, and the fin tubes 223a.

As illustrated in FIG. 6A, the tubes 221a, the fin tubes 222a, and the fin tubes 223a of the preheating unit 221, the low-temperature heating unit 222, and the high-temperature heating unit 223 may be arranged in a lattice pattern relative to the flowing direction of the flue gas $G_6$ and the flue gas $G_7$ in the sectional view, respectively. By arranging in this manner, the contact area of the tubes 221a, the fin tubes 222a, and the fin tubes 223a relative to the flue gas $G_6$ that is introduced into the reheater 22 is increased. Consequently, it is possible to efficiently heat the flue gas $G_6$ and discharge the flue gas $G_6$ as the flue gas $G_7$.

Figure 6B:
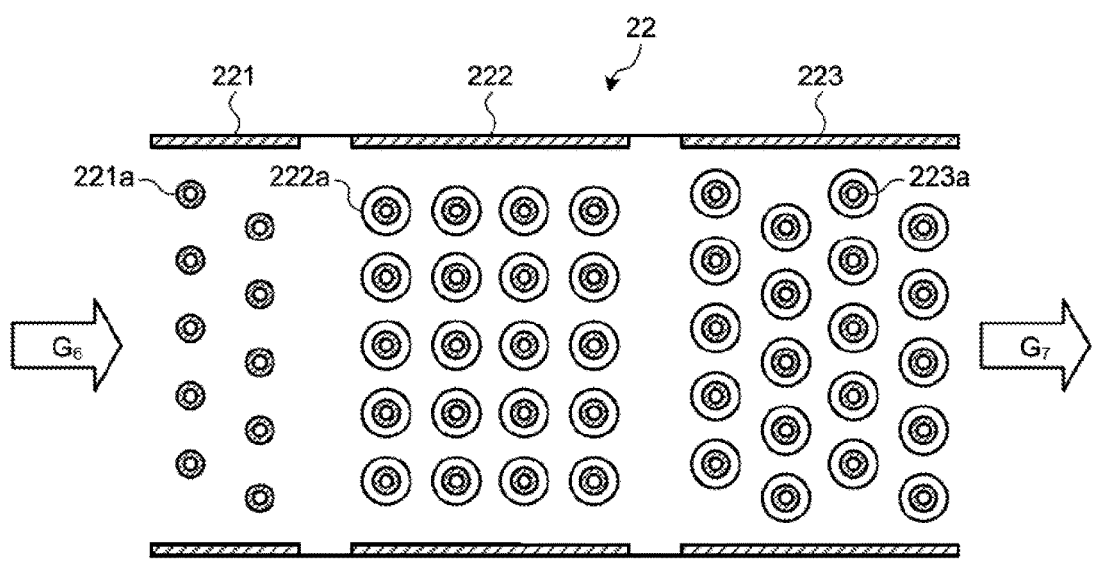
FIG. 6B is a diagram illustrating another example of the configuration of the reheater according to the embodiment of the present invention.

FIG. 6B is a diagram illustrating another example of the configuration of the reheater 22. Similar to FIG. 6A, FIG. 6B is a schematic view of a vertical section of the tubes 221a, the fin tubes 222a, and the fin tubes 223a of the preheating unit 221, the low-temperature heating unit 222, and the high-temperature heating unit 223 of the reheater 22 relative to the extending direction of the tubes 221a, the fin tubes 222a, and the fin tubes 223a.

In the example illustrated in FIG. 6B, the tubes 221a and the fin tubes 223a of the preheating unit 221 and the high-temperature heating unit 223 are arranged in a lattice pattern relative to the flowing direction of the flue gas $G_6$ and the flue gas $G_7$ in the sectional view, respectively. Moreover, the fin tubes 222a of the low-temperature heating unit 222 are arranged in a tetragonal lattice pattern relative to the flowing direction of the flue gas $G_6$ and the flue gas $G_7$ in the sectional view, respectively. By arranging in this manner, the contact area of the tubes 221a and the fin tubes 223a relative to the flue gas $G_6$ introduced into the reheater 22 is increased, and a sufficient contact area can be obtained. Moreover, in the low-temperature heating unit 222, the contact area between the flue gas $G_6$ and the fin tubes 222a can be moderately reduced, thereby improving the flow velocity of the flue gas $G_6$ that passes through the low-temperature heating unit 222. Thus, it is possible to efficiently heat the flue gas $G_6$ and discharge the flue gas $G_6$ as the flue gas $G_7$. In this manner, it is possible to prevent dust in the flue gas $G_6$ from adhering to the fin tube 222a of the low-temperature heating unit 222, and corrosion of the fin tube 222a of the low-temperature heating unit 222 caused by the mist, while securing sufficient heat exchange efficiency in the preheating unit 221 and the high-temperature heating unit 223. In the example illustrated in FIG. 6B, only the fin tubes 222a of the low-temperature heating unit 222 are arranged in a tetragonal lattice pattern. However, the fin tubes 223a of the high-temperature heating unit 223 may also be arranged in a tetragonal lattice pattern. In this case, the gas flow velocity of the flue gas $G_6$ that flows through the high-temperature heating unit 223 is further improved. Consequently, it is possible to efficiently heat the flue gas $G_6$ and discharge the flue gas $G_6$ as the flue gas $G_7$. As a result, it is also possible to further reduce dust from adhering to the fin tube 222a of the low-temperature heating unit 222 and reduce corrosion of the fin tube 222a of the low-temperature heating unit 222 caused by the mist.

REFERENCE SIGNS LIST 10 air pollution control system
11 boiler
12 denitration device
13 air heater
14 electronic precipitator
15 air blower
16 desulfurization device
17 stack
20 heat exchanger
21 heat recovery unit
21a fin tube
22 reheater
221 preheating unit
222 low-temperature heating unit
223 high-temperature heating unit
221a tube
222a, 223a fin tube
$G_0$, $G_1$, $G_2$, $G_3$, $G_4$, $G_5$, $G_6$, $G_7$ flue gas
L circulation line
$L_1$ steam supply line
M heat medium
P liquid feeding pump
S steam
$V_1$, $V_2$ flow control valve

The invention claimed is:

1. A heat exchanger, comprising:
a heat recovery unit that causes a heat medium to recover heat from flue gas from a combustion engine through first heat exchange by bringing the flue gas into contact with a heat transfer tube in which the heat medium flows;
a reheater that includes a preheating unit configured to preheat the flue gas after the first heat exchange through second heat exchange by bringing the flue gas after the first heat exchange into contact with the heat transfer tube in which the heat medium after the first heat exchange flows, and a heating unit configured to heat the flue gas after the second heat exchange through third heat exchange by bringing the flue gas after the second heat exchange into contact with the heat medium after the second heat exchange;
a circulation line that circulates the heat medium between the heat recovery unit and the reheater; and
a control unit that calculates a recovered heat quantity to be recovered by the heat recovery unit from the flue gas through the first heat exchange, and that controls temperature of the heat medium to be supplied to the reheater after the first heat exchange within a predetermined range based on the calculated recovered heat quantity.

2. The heat exchanger according to claim 1, wherein the control unit calculates the recovered heat quantity based on at least one type selected from the group consisting of gas temperature of the flue gas introduced into the heat exchanger, a gas flow of the flue gas, and operation load of the combustion engine.

3. The heat exchanger according to claim 1, wherein the control unit heats the heat medium after the first heat exchange, when the recovered heat quantity is less than a predetermined value.

4. The heat exchanger according to claim 3, wherein the control unit supplies steam to the heat medium after the first heat exchange from a steam supply unit, and sets the temperature of the heat medium after the first h exchange within the predetermined range.

5. The heat exchanger according to claim 1, wherein
the circulation line includes a bypass line that bypasses the heat recovery unit, and
the control unit sets the temperature of the heat medium within the predetermined range, by circulating the heat medium between the heat recovery unit and the reheater via the bypass line, when the recovered heat quantity exceeds the predetermined value.

6. The heat exchanger according to claim 1, wherein in the reheater, a plurality of heat transfer tubes of the heating unit are arranged in a tetragonal lattice pattern relative to a flowing direction of the flue gas.

7. A method for controlling a heat exchanger that includes
a heat recovery unit that causes a heat medium to recover heat from flue gas from a combustion engine through first heat exchange by bringing the flue gas into contact with a heat transfer tube in which the heat medium flows; and
a reheater that includes a preheating unit configured to preheat the flue gas after the first heat exchange using heat of the heat medium after the first heat exchange through second heat exchange by bringing the flue gas after the first heat exchange into contact with the heat transfer tube in which the heat medium after the first heat exchange flows, and a heating unit configured to heat the flue gas after the second heat exchange through third heat exchange by bringing the flue gas after the second heat exchange into contact with the heat medium after the second heat exchange, the method for controlling the heat exchanger, comprising:
a step of calculating a recovered heat quantity to be recovered by the heat recovery unit from the flue gas through the first heat exchange; and
a step of controlling temperature of the heat medium to be supplied to the reheater within a predetermined range by heating the heat medium after the first heat exchange, when the calculated recovered heat quantity becomes less than a predetermined value.

8. The method for controlling the heat exchanger according to claim 7, the method further comprising a step of controlling the temperature of the heat medium within the predetermined range by making the heat medium flow in a bypass line that bypasses the heat recovery unit, when the calculated recovered heat quantity exceeds the predetermined value.

* * * * *